US008744538B2

(12) United States Patent
Carmonius et al.

(10) Patent No.: US 8,744,538 B2
(45) Date of Patent: Jun. 3, 2014

(54) FULLY FLAT SLIDER

(75) Inventors: Ola Peter Carmonius, Malmö (SE); Magnus Björn Ovar Lindvall, Lund (SE)

(73) Assignees: Sony Mobile Communications AB, Lund (SE); Sony Corporation, Tokyo (JP)

( * ) Notice: Subject to any disclaimer, the term of this patent is extended or adjusted under 35 U.S.C. 154(b) by 476 days.

(21) Appl. No.: 12/700,831

(22) Filed: Feb. 5, 2010

(65) Prior Publication Data

US 2011/0195760 A1 Aug. 11, 2011

(51) Int. Cl.
*H04M 1/00* (2006.01)
*H04M 9/00* (2006.01)

(52) U.S. Cl.
USPC ............... 455/575.4; 455/575.3; 379/433.12

(58) Field of Classification Search
CPC .................................................. H04M 1/0237
USPC ......................................................... 455/575.4
See application file for complete search history.

(56) References Cited

U.S. PATENT DOCUMENTS

| 5,494,447 | A | 2/1996 | Zaidan | |
|---|---|---|---|---|
| 7,107,084 | B2 * | 9/2006 | Duarte et al. | 455/575.3 |
| 7,136,282 | B1 * | 11/2006 | Rebeske | 361/679.55 |
| 7,158,634 | B2 * | 1/2007 | Eromaki | 379/433.13 |
| 2005/0044665 | A1 | 3/2005 | Kuramochi | |
| 2008/0161075 | A1 * | 7/2008 | Kim et al. | 455/575.4 |

OTHER PUBLICATIONS

International Search Report and Written Opinion dated Apr. 6, 2011 issued in corresponding PCT application No. PCT/IB2011/050069, 10 pages.
International Preliminary Report on Patentability dated Aug. 16, 2012 issued in corresponding PCT application No. PCT/IB2011/050069, 7 pages.

* cited by examiner

*Primary Examiner* — Huy C Ho
(74) *Attorney, Agent, or Firm* — Snyder, Clark, Lesch & Chung, LLP

(57) ABSTRACT

A device may include a lower panel, an upper panel, bi-stable shaft, and guide link. The lower panel may include four sides, a first surface, and a second surface. The upper panel may include four sides, a third surface, and a fourth surface, where the fourth surface overlays the first surface of the lower panel when the device is in a first configuration. A first end of the bi-stable shaft may be rotatably attached proximate to a first of the sides of the lower panel. A second end of the bi-stable shaft may be rotatably attached proximate to a first of the sides of the upper panel. The guide link may include two ends, a first end rotatably attached proximate to the first side of the upper panel and a second end slidably inserted in a track parallel to the first side of the lower panel.

20 Claims, 10 Drawing Sheets

FULLY FLAT SLIDER

BACKGROUND

A slider permits a keyboard and display of a device to be stored in a compact space and covered for use. For example, FIG. 1A and FIG. 1B illustrate a tilting slider and a flat slider, respectively. In each case, a user may slide out a display relative to a base (e.g., keyboard), and position the display at a particular angle relative to the base for use.

SUMMARY

According to one aspect, a device may include a lower panel having a track, an upper panel that overlays the lower panel when the device is in a first position and a guide link including a head, an interface portion, and a body connecting the head to the interface portion, the head rotatably affixed to the upper panel and the interface portion being slidably retained in the track on the lower panel. In addition, the device may include a cam shaft including a cam and a shaft rigidly connected to the cam, the cam rotatably affixed to the lower panel and an end of the shaft rotatably affixed to the upper panel. When the lower panel and the upper panel are in a second position between the first position and a bi-stable position, the cam shaft may move the upper panel toward the first position. When the lower panel and the upper panel are in a third position between the bi-stable position and a fully flat position, the cam shaft may move the upper panel toward the fully flat position.

Additionally, the upper panel may include a display and a lower panel includes one of a keypad or a display.

Additionally, the device may include a cellular phone.

Additionally, the device may include another panel.

Additionally, the device may include a component inserted about the head of the guide link, the component applying a torque to turn the guide link toward a surface of the upper panel when a force is applied to the upper panel.

Additionally, the component may include one of a rubber band, pin, spring, or coil spring.

Additionally, the cam or the end of the shaft may include one or more springs to cause the cam shaft to move the upper panel toward the first position when in the second position, or move the upper panel toward the fully flat position when in the third position.

Additionally, the device may further include a first pin that rotatably affixes the guide link to the upper panel, a second pin that rotatably affixes the end of cam shaft to the upper panel, and a third pin that rotatably affixes the cam to the lower panel.

Additionally, the interface portion may include a t-shaped portion that prevents the interface portion from moving out of the track.

Additionally, the device may further include another guide link and another cam shaft located on an opposite side of the lower and upper panels.

According to another aspect, the device may include a lower panel, an upper panel, a bi-stable shaft, a guide link, and a spring. The lower panel may include four sides, a first surface, and a second surface. The upper panel may include four sides, a third surface, and a fourth surface, the fourth surface overlaying the first surface of the lower panel when the device is in a first configuration. A first end of the bi-stable shaft may be rotatably attached proximate to a first of the sides of the lower panel, and a second end of the bi-stable shaft may be rotatably attached proximate to a first of the sides of the upper panel. The guide link may include two ends, a first end rotatably attached proximate to the first side of the upper panel and a second end slidably inserted in a track locate on the first side of the lower panel. The spring may be positioned about the first end of the guide link, the spring applying a force to the guide link toward the fourth surface of the upper panel when a force is applied to a second of the sides of the upper panel to place the upper and lower panels in a flat configuration.

Additionally, the upper panel may include a keyboard or a display screen on the third surface.

Additionally, the bi-stable shaft may include a cam about the first end of the bi-stable shaft, the cam applying a torque to the bi-stable shaft in one direction when the cam is in one rotational position and applying a torque to the bi-stable shaft in another direction when the cam is in a different rotational position.

Additionally, the device may include one of a cellular telephone, a personal digital assistant, a laptop, a notepad, an electronic tablet, a digital camera, a music playing device, an electronic book (e-book), or a netbook.

Additionally, the guide link may include a t-shaped portion that slides in the track when the upper panel moves from the first configuration to the flat configuration.

Additionally, the device may further include a second bi-stable shaft, a first end of the second bi-stable shaft rotatably attached to a third of the sides of the lower panel and a second end of the second bi-stable shaft rotatably attached to a third of the sides of the upper panel. The device may also include a second guide link having two ends, a first end of the second guide link rotatably attached to the third side of the upper panel and a second end slidably inserted in a track parallel to the third side of the lower panel. The third side of the lower panel and the third side of the upper panel may be parallel to the first side of the upper panel and the first side of the lower panel.

Additionally, the device may further include another panel with four sides, a fifth and sixth surfaces, the fifth surface overlaying the third surface of the upper panel when the device is in the folded configuration.

According to yet another aspect, the device may include means for providing a first surface and a track and means for providing a second surface, the means for providing the second surface overlaying the means for providing the first surface when the device is in a first position. In addition, the device may include means for guiding the first surface. The means for guiding the first surface may include a head, an interface portion, and a body connecting the head to the interface portion, the head rotatably affixed to the means for providing the second surface and the interface portion being slidably retained in the track. Further, the device may include means for moving the means for providing the first surface relative to the means for providing the second surface when force is applied to the means for providing the second surface, the means for moving including a cam and a shaft rigidly connected to the cam, the cam rotatably affixed to the means for providing the first surface and an end of the shaft rotatably affixed to the means for providing the second surface. When the device is in a second position between the first position and a bi-stable position, the shaft may move the means for providing the second surface toward the first position. When the device is in a third position between the bi-stable position and a fully flat position, the shaft may move the means for providing the second surface toward the fully flat position.

Additionally, the means for providing the second surface may include a display.

Additionally, the device may include a cellular phone.

BRIEF DESCRIPTION OF THE DRAWINGS

The accompanying drawings, which are incorporated in and constitute a part of this specification, illustrate one or more embodiments described herein and, together with the description, explain the embodiments. In the drawings.

DETAILED DESCRIPTION

The following detailed description refers to the accompanying drawings. The same reference numbers in different drawings may identify the same or similar elements. As used herein, the term "communication device" may include: a mobile telephone; a cellular phone; a personal communications system (PCS) terminal that may combine a cellular radiotelephone with data processing, facsimile, and/or data communications capabilities; a laptop; a personal digital assistant (PDA) that can include a telephone; a music playing device; a gaming device or console; a peripheral (e.g., wireless headphone); a digital camera; an electronic tablet; an electronic book (e-book), a netbook; or another type of computational or communication device.

In the following, a fully flat slider may be included in a communication device or another type of device (e.g., a wallet-like case, folding picture frame, etc.) that may provide for a fully flat position using few parts and little space. The fully flat end-position may be desirable to maximize usable surface, for example, of dual displays, a QWERTY keyboard, etc., depending on user preference or use of the slider (e.g., running an application whose input is most easily provided via a QWERTY keyboard or an application that requires a certain amount of display area, etc.).

Figure 1A:
FIGS. 1A and 1B illustrate a tilting QWERTY slider and a flat QWERTY slider, respectively.
Figure 1B:
Figure 2A:
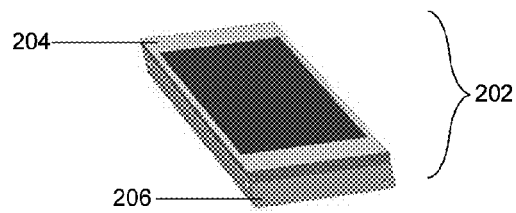
FIGS. 2A through 2E illustrate an overview of exemplary operation of an exemplary fully flat slider.

FIGS. 2A through 2E illustrate an overview of exemplary operation of a fully flat slider 202. FIG. 2A shows fully flat slider 202 in a folded or stored position. In some implementations, this position may correspond to use of the device in a tablet mode with a single display. As shown, fully flat slider 202 may include an upper panel 204 and a lower panel 206 that are stacked in the folded or stored position. In a different implementation, fully flat slider 202 may include additional panels that are stacked in the folded or stored position.

Figure 2B:
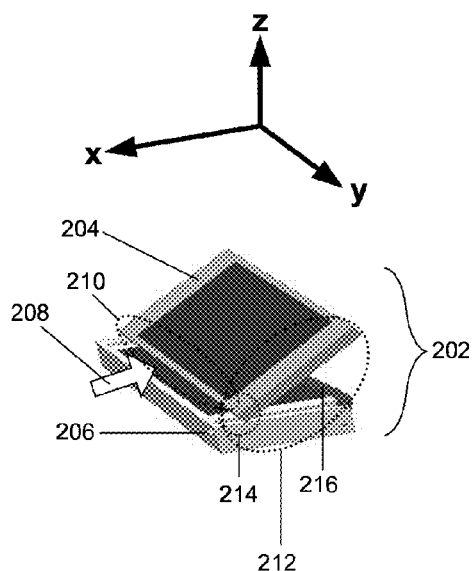

FIG. 2B shows fully flat slider 202 in a position resulting from applying a force to upper panel 204 relative to lower panel 206 in a direction indicated by an arrow 208. The force may be applied to an edge located on upper panel 204 in the area shown by a dotted ellipse 210 ("push edge" hereinafter).

As shown in FIG. 2B, in the area near the edges located on upper and lower panels 204 and 206 in the area enclosed by a dotted ellipse 212 ("right side edges" hereinafter), upper panel 204 and lower panel 206 may include a guide link 214 (not fully shown) and cam shaft 216. Guide link 214 and cam shaft 216 may guide or aid upper panel 204 in sliding relative to lower panel 206, such that the right side edges remain in a plane parallel to the x-z plane shown in FIG. 2B. Fully flat slider 202 may also include another guide link and cam shaft on the left side edges of upper and lower panels 204 and 206, although they are not shown in FIG. 2C.

Figure 2C:
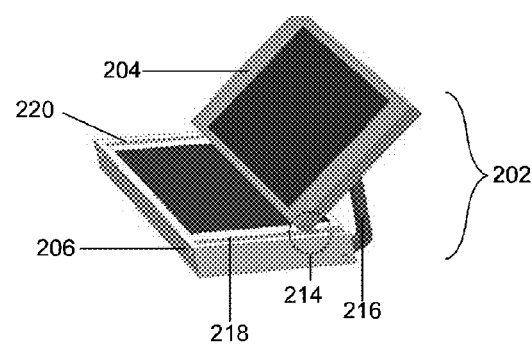

FIG. 2C shows fully flat slider 202 with guide link 214 in an end position. Guide link 214 may reach the end position when guide link 214 may not further slide in the direction of arrow 208 due to a stop in a guide link track 218 in lower panel 206. The guide link (not shown) on the left edges of upper and lower panels 204 and 206 may also reach a stop in a guide link track 220 in lower panel 206.

Figure 2D:
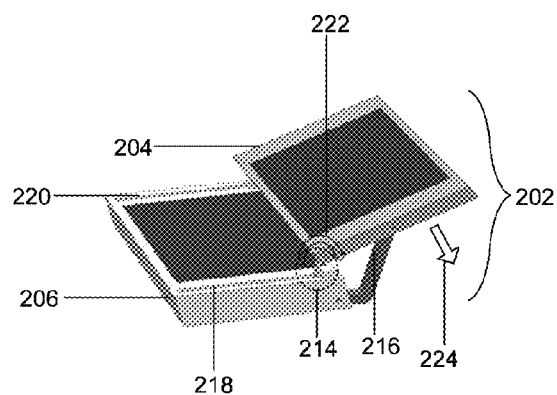

FIG. 2D shows fully flat slider 202 in a bi-stable position resulting from applying a force to upper panel 204 relative to lower panel 206 when fully flat slider 202 is in the position illustrated in FIG. 2C. After reaching position illustrated in FIG. 2C, fully flat slider 202 may reach the bi-stable position in FIG. 2D as guide link 214 rotates in the direction of arrow 222 about one end of guide link 214 abutting the stop in guide link track 218 in lower panel 206. At the bi-stable position, depending on the direction of perturbation to its current position of upper panel 204, cam shaft 216 may begin to push/pull upper panel 204 up or down. For example, assuming that upper panel 204 has reached the position shown in FIG. 2C due to a push in the direction of arrow 208, carryover momentum may result in a torque about guide link 214 and partly downward force on upper panel 204. Such a force may cause cam shaft 216 to begin moving downward along with upper panel 204 in the direction of arrow 224.

Figure 2E:
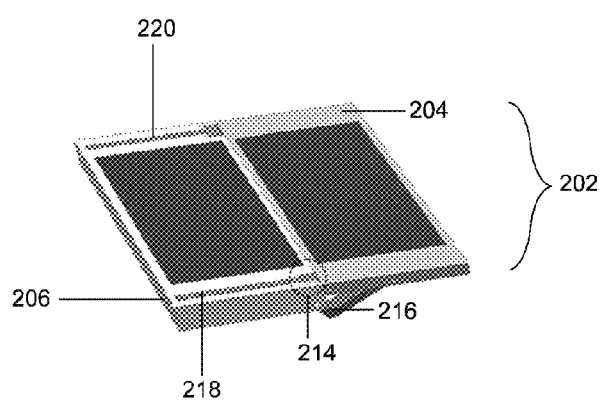

FIG. 2E illustrates fully flat slider 202 in the flat position resulting from cam shaft 216 moving downward from the bi-stable position of FIG. 2D. In the flat position, a user may maximize usable surface, for example, of dual displays, keyboard, etc.

Figure 3:
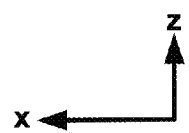
FIG. 3 is a transparent side view of the fully flat slider of FIGS. 2A through 2E.
Figure 3:
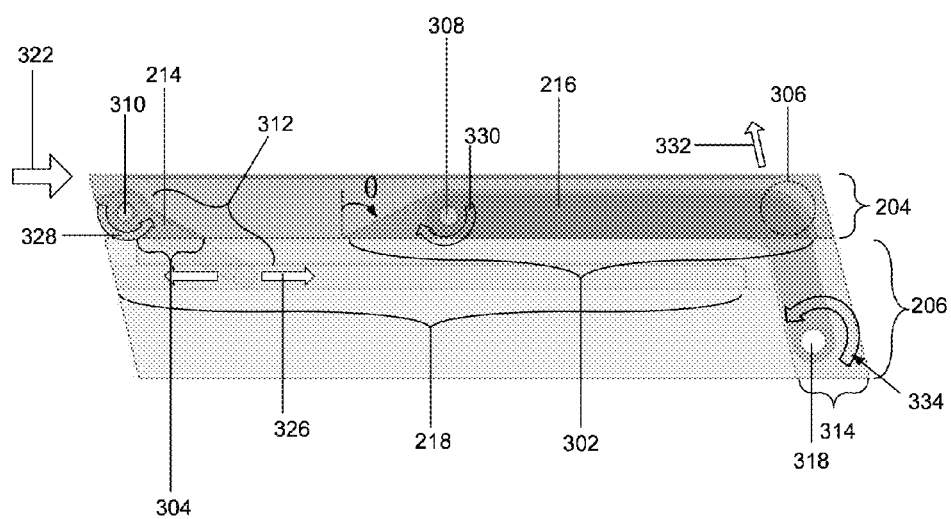

FIG. 3 is a transparent side view of fully flat slider 202. The cross section shows panels 204 and 206 in a folded/stored configured. As shown in FIG. 3, upper panel 204 and lower panel 206 of fully flat slider 202 may include guide link 214 and cam shaft 216. In upper panel 204, cam shaft slot 302 and guide link slot 312 may provide space for holding a long portion of L-shaped cam shaft 216 and a portion of guide link 214, respectively. Similarly, in lower panel 206, cam shaft slot 314 and guide link track 218 may provide space for holding a short portion of L-shaped cam shaft 216 and another portion of guide link 214, respectively.

In the folded arrangement illustrated in FIG. 3, one portion of guide link 214 may be positioned in guide link slot 312 of upper panel 204 and rotatably affixed to upper panel 204 by a pin 310. Another portion of guide link 214 may be positioned in guide link track 218 in lower panel 206. A spring (e.g., a coil spring) (not shown) that is disposed about pin 310 may apply a torque or force to guide link 214 in the direction illustrated by arrow 328. That is, guide link 214 may be pre-loaded with the spring. In a different implementation, in pace of the spring, a rubber band or another component may be used to pre-load guide link 214.

In the same folded or stored arrangement, a long arm of cam shaft 216 may be positioned in cam shaft slot 302 and a short arm, which is adjoined to the long arm of cam shaft 316 at elbow 306, may be positioned in cam shaft slot 314 of lower panel 206. The ends of the long and short arms of cam shaft 216 may be rotatably affixed to upper and lower panels 204 and 206 via pins 308 and 318 inside cam shaft slots 302 and 314, respectively. The shape of cam shaft 216 and/or a spring disposed around pin 318 may apply a torque or force to cam shaft 216 in the direction of arrow 334.

When in operation, a force may be applied to the push edge of upper panel 204 in the direction of arrow 322. The force may cause upper panel 204 to move in the direction of arrow 322 and tilt upwards in the direction of arrow 332.

Figure 4:
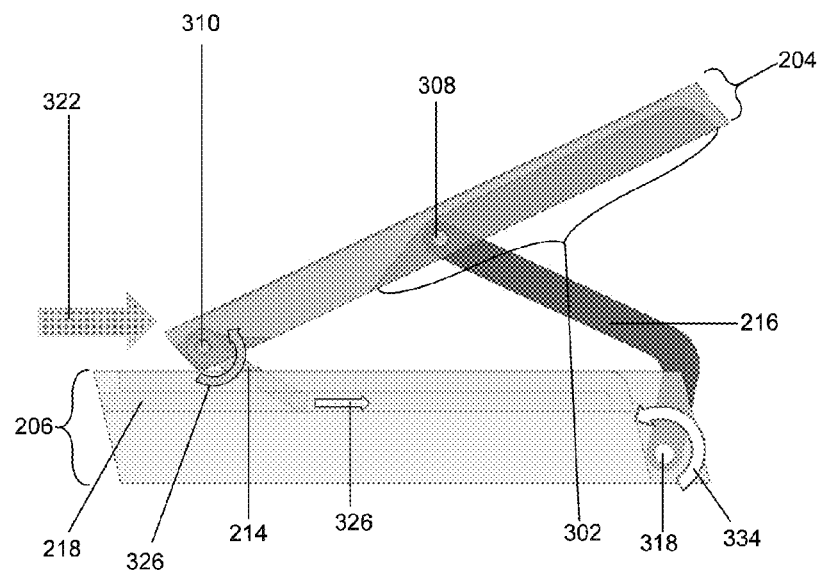
FIGS. 4 through 6 are detailed transparent side views of the fully flat slider in the positions illustrated in FIGS. 2B through 2D.
Figure 5:
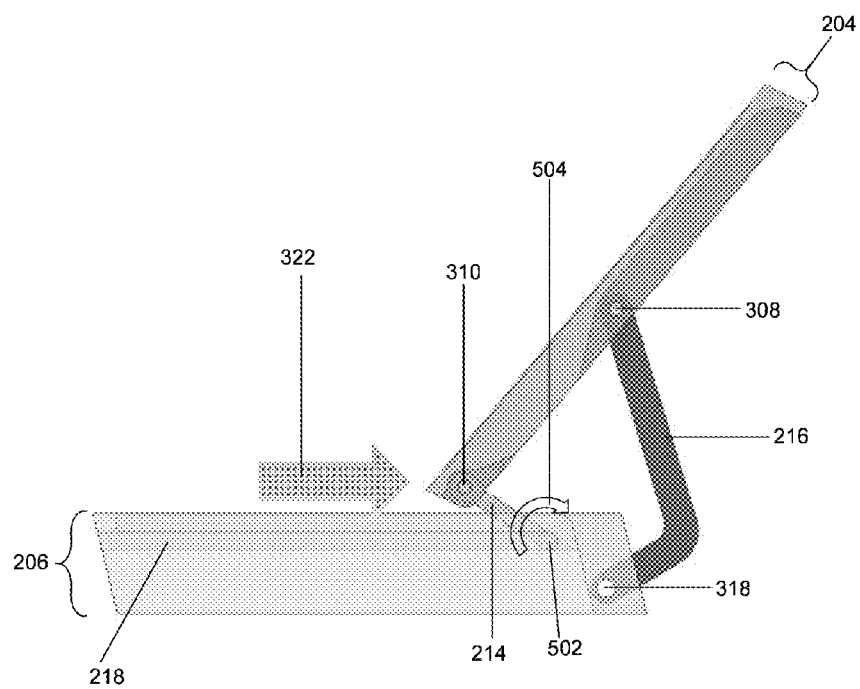
Figure 6:
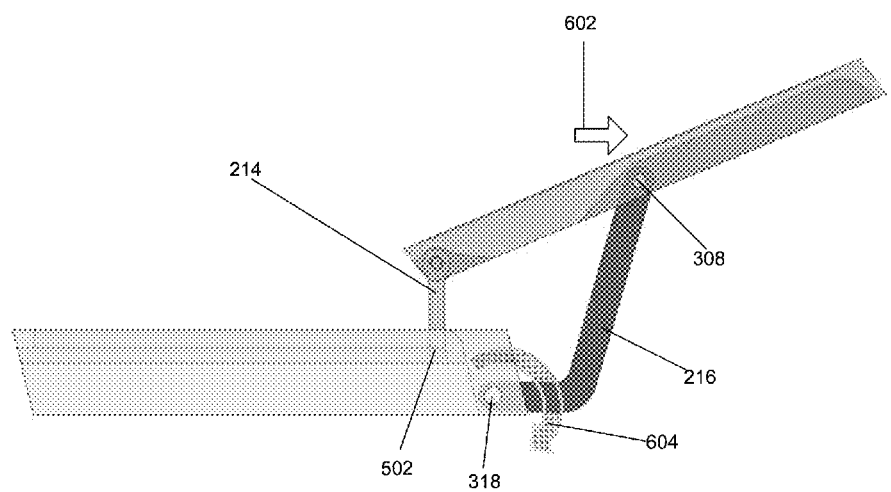

FIGS. 4 through 6 are detailed transparent side views of fully flat slider 202 in the positions illustrated in FIGS. 2B through 2D. FIG. 4 is a detailed transparent side view of fully flat slider 202 in motion and in the position illustrated in FIG. 2B. The position illustrated in FIG. 4 may result from applying a force to upper panel 204 in the direction of arrow 322, as illustrated in FIG. 3.

In FIG. 4, as upper panel 204 moves in the direction of arrow 322 and tilts upward, the location of pin 308 may change, causing cam shaft 216 to rotate counter to the direction of torque about pin 318. While upper panel 204 is in motion, an end of guide link 214 may slide in guide link track 218 of lower panel 206 in the direction of arrow 326. The spring on guide link 214 may guarantee that guide link 214 moves with a leading angle (i.e., guide link 214 forms an acute angle relative to upper panel 204). The force applied by the spring located around pin 310 may help ensure that upper panel 204 stays tight or secure relative to lower panel 206.

FIG. 5 is a detailed transparent side view of fully flat slider 202 in motion and in the position illustrated in FIG. 2C. The position may be reached when an end 502 of guide link 214 that has been sliding in guide link track 218 reaches a stop. Once the position is reached, the force on upper panel 204 may cause guide link 214 to rotate about end 502 in the direction of arrow 504. The force needs to be large enough to overcome both the torques about pin 310 and pin 318.

FIG. 6 a detailed transparent side view of fully flat slider 202 in the bi-stable position illustrated in FIG. 2D. The bi-stable transition position may be reached when the rotation of guide link 214 about end 502 results in guide link 214 forming a particular angle relative to the surface of lower panel 206 (e.g., 90° angle). In that position, the torque on cam shaft 216 about pin 318 may be such that cam shaft 216 is bi-stable. That is, if a perturbing force is applied to upper panel 204 and/or on cam shaft 216, cam shaft 216 may begin to rotate either counter to arrow 604 or along arrow 604, depending on the direction of the perturbation.

For example, assuming that upper panel 204 has reached the position shown in FIG. 6, any carryover momentum from the motion depicted in FIG. 5 may result in movement of upper panel 204 in the direction of arrow 602. The force may cause cam shaft 216 to begin rotating in the clockwise direction about pin 318. Once cam shaft 216 passes the bi-stable transition point, a torque may develop about pin 318 and rotate cam shaft 216 about pin 318 in the direction of arrow 604.

Figure 7:
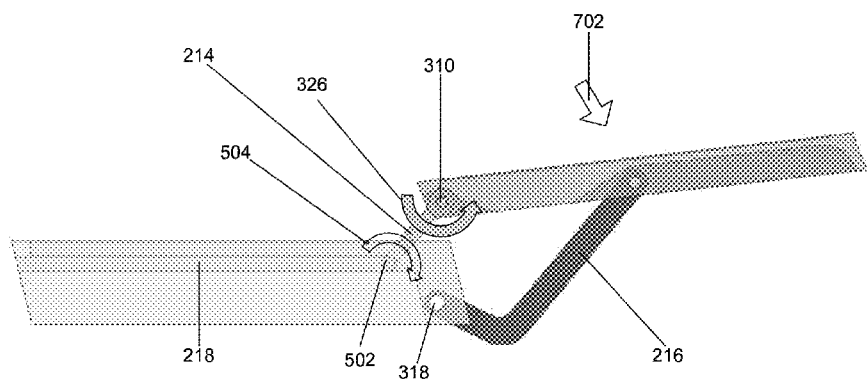
FIG. 7 is a detailed transparent side view of the fully flat slider in an intermediate position between those illustrated in FIGS. 2D and 2E.

FIG. 7 is a detailed transparent side view of fully flat slider 202 in an intermediate position between those illustrated in FIGS. 2D and 2E. The intermediate position may be reached as cam shaft 216 rotates about pin 318. Because of the torque about the head of guide link 214 caused by, for example, the spring located around pin 310, guide link 214 is prevented from sliding back in guide link track 218. Because the bi-stable transition point has been passed, cam shaft 216 may continue to rotate in the clockwise direction around pin 318, pulling upper panel 204 in the direction of arrow 702.

Figure 8:
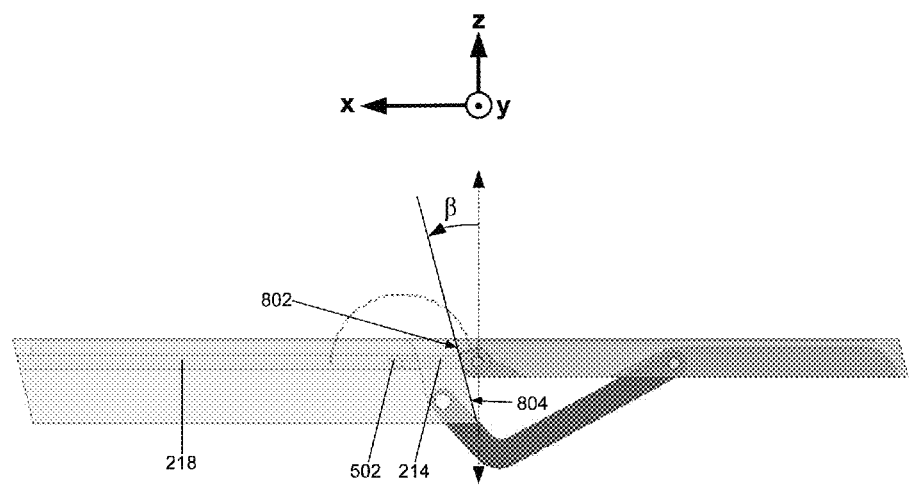
FIG. 8 is a detailed transparent side view of the fully flat slider in the position illustrated in FIG. 2E.

FIG. 8 is a detailed transparent side view of fully flat slider 202 in the flat position illustrated in FIG. 2E. The flat position, or the end position, may be reached when the rotation of cam shaft 216 in FIG. 7 ends with the edge surface 802 of upper panel 204 abutting or contacting the edge surface 804 of lower panel 206. In the end position, the bottom surface of guide link track 218 may prevent guide link 214 from further rotating about end 502 as well as provide support for guide link 214. Guide link 214 may be dimensioned such that there is little or no gap between upper and lower panels 204 and 206. The angle that edge surfaces 802 and 804 form against a z-y plane, illustrated as β, may aid in supporting and/or stabilizing upper panel 204 against lower panel 206. In addition, β may allow guide link 214 to be short. As β approaches 0, the guide link length may need to be increased if tight fitting between upper panel 204 and lower panel 206 is to be obtained.

Figure 9:
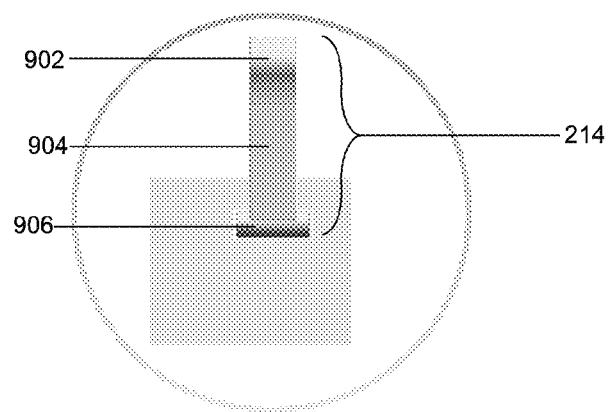
FIG. 9 is an exploded view of an exemplary guide link of FIG. 3.

FIG. 9 is an exploded view of guide link 214. As shown, guide link 214 may include a head 902, body 904, and link-track interface 906. Head 902 may provide for guide link 214 to be rotatably affixed to upper panel 204, as well as provide for an installed spring to exert a torque to guide link 214 relative to upper panel 204. Body 904 may adjoin head 902 to link-track interface 906. Link-track interface 906 may move along guide link track 218. The T-shape of the link-track interface 906 may prevent link-track interface 906 from moving out of guide link track 218.

Figure 10A:
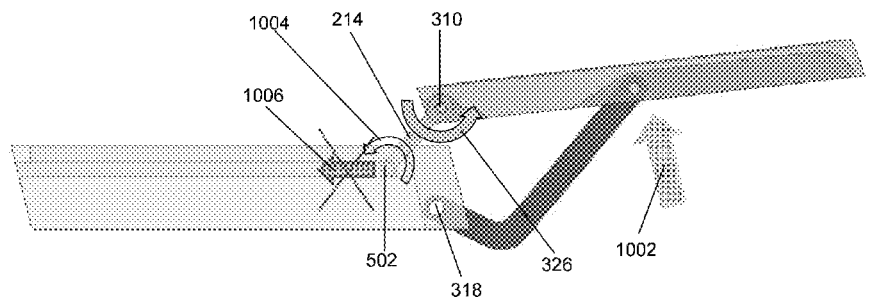
FIGS. 10A and 10B are detailed transparent side views of the fully flat slider in reverse operation.
Figure 10B:
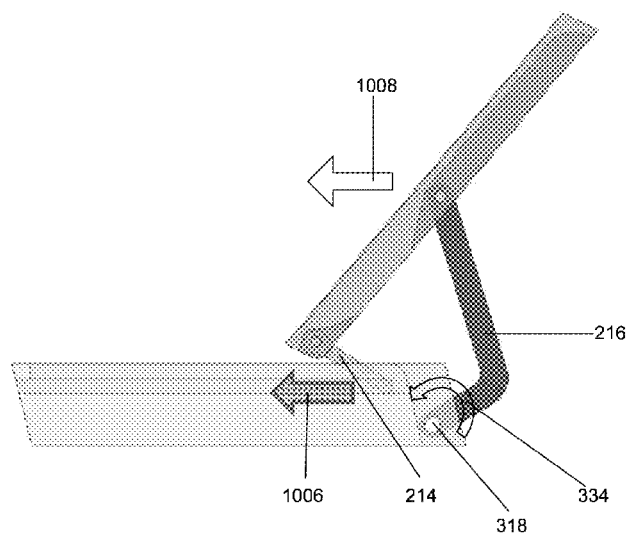

FIGS. 10A and 10B are detailed transparent side views of fully flat slider 202 in reverse operation (e.g., closing operation). The position in FIG. 10A may be reached when a force is applied to upper panel 204 or to cam shaft 216 in the direction of arrow 1002. The force may need to be strong enough to overcome the torque about pin 318 of cam shaft 216 in the clockwise direction. In the position, because of the torque applied to guide link 214 in the direction of arrow 326, as upper panel 204 moves up, guide link 214 may rotate about end 502 as indicated by arrow 1004, and not slide in guide link track 218 in the direction of arrow 1006 (as indicated by the "X" in FIG. 10A), until guide link 214 has rotated past the bi-stable transition point.

FIG. 10B shows the movement of upper panel 204 relative to lower panel 206 after guide link 214 passes, in the reverse operation, the bi-stable position (e.g., the vertical orientation). Due to the torque applied to cam shaft 216 in the direction of arrow 334, cam shaft 216 may push upper panel 204 in the direction of arrow 1008. Upper panel 204, in turn, may direct guide link 214 in direction of arrow 1006. Eventually, fully flat slider 202 may return to the configuration illustrated in FIG. 3.

CONCLUSION

In the foregoing description, a fully flat slider may provide for a fully flat position using few parts and little space. The fully flat end-position may be desirable to maximize usable surface, for example, for use with dual displays, a QWERTY keyboard, compartments, etc., depending on user preference or use of the slider (e.g., running an application whose input is most easily provided via a QWERTY keyboard or an application that requires a certain amount of display space, etc.).

While the foregoing description of implementations provides illustration, it is not intended to be exhaustive or to limit the implementations to the precise form disclosed. Modifications and variations are possible in light of the above teachings or may be acquired from practice of the teachings. For example, in the above description, torque may be applied about pin 318 to cam shaft 216. In different implementations, torque to provide the bi-stability to cam shaft 216 may be applied about pin 308 to cam shaft 216, or about each of pins 308 and 318 to cam shaft 216.

It should be emphasized that the term "comprises/comprising" when used in this specification is taken to specify the presence of stated features, integers, steps or components but does not preclude the presence or addition of one or more other features, integers, steps, components, or groups thereof.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A device comprising:
    a lower panel having a track;
    an upper panel that overlays a face of the lower panel when the device is in a first position;
    a guide link including a head, an interface portion, and a body connecting the head to the interface portion, the head rotatably affixed to the upper panel and the interface portion being slidably retained in the track on the lower panel and at least a part of the interface portion being slidable in parallel to the face of the lower panel; and
    a cam shaft including a cam and a shaft rigidly connected to the cam, the cam rotatably affixed to the lower panel and an end of the shaft rotatably affixed to the upper panel, wherein
        when the lower panel and the upper panel are in a second position between the first position and a bi-stable position, the cam shaft moves the upper panel toward the first position,
        when the lower panel and the upper panel are in a third position between the bi-stable position and a fully flat position, the cam shaft moves the upper panel toward the fully flat position, and
        when the lower panel and the upper panel are in the fully flat position, the face of the lower panel and a face of the upper panel are in a substantially same plane, and wherein the lower panel and the upper panel are in the fully flat position when the body of the guide link is positioned parallel to the lower panel.

2. The device of claim 1, wherein the upper panel includes a display and a lower panel includes one of a keypad or a display.

3. The device of claim 2, wherein the device includes a cellular phone.

4. The device of claim 3, wherein the device includes another panel.

5. The device of claim 1, further comprising:
    a component inserted about the head of the guide link, the component applying a torque to turn the guide link toward a surface of the upper panel when a force is applied to the upper panel.

6. The device of claim 5, wherein the component includes one of: a rubber band, pin, spring, or coil spring.

7. The device of claim 1, wherein the cam or the end of the shaft includes one or more springs to cause the cam shaft to:
    move the upper panel toward the first position when in the second position; or
    move the upper panel toward the fully flat position when in the third position.

8. The device of claim 1, further comprising a first pin that rotatably affixes the guide link to the upper panel, a second pin that rotatably affixes the end of cam shaft to the upper panel, and a third pin that rotatably affixes the cam to the lower panel.

9. The device of claim 1, wherein the interface portion includes a t-shaped portion that prevents the interface portion from moving out of the track.

10. The device of claim 1, further comprising another guide link and another cam shaft located on an opposite side of the lower and upper panels.

11. A device comprising:
    a lower panel with four sides, a first surface, and a second surface;
    an upper panel with four sides, a third surface, and a fourth surface, the fourth surface overlaying the first surface of the lower panel when the device is in a first configuration;
    a bi-stable shaft, a first end of the bi-stable shaft rotatably attached proximate to a first of the sides of the lower panel and a second end of the bi-stable shaft rotatably attached proximate to a first of the sides of the upper panel;
    a guide link having a first end, a second end, and a body connecting the first end to the second end, the first end rotatably attached proximate to the first side of the upper panel, the second end slidably inserted in a track located on the first side of the lower panel, and at least a part of the second end being slidable in parallel to the first face; and
    a spring positioned about the first end of the guide link, the spring applying torque to the guide link toward the fourth surface of the upper panel when a force is applied to a second of the sides of the upper panel to place the upper and lower panels in a flat configuration,
    wherein the first surface of the lower panel and the fourth surface of the upper panel are in a substantially same plane in the flat configuration, and
    wherein the device is in the flat configuration when the body is positioned parallel to the lower panel.

12. The device of claim 11, wherein the upper panel includes a keyboard or a display screen on the third surface.

13. The device of claim 11, wherein the bi-stable shaft includes a cam about the first end of the bi-stable shaft, the cam applying torque to the bi-stable shaft in one direction when the cam is in one rotational position and applying torque to the bi-stable shaft in another direction when the cam is in a different rotational position.

14. The device of claim 11, wherein the device includes one of:
    a cellular telephone, a personal digital assistant, a laptop, a notepad, an electronic tablet, a digital camera, a music playing device, an electronic book (e-book), or a netbook.

15. The device of claim 11, wherein the guide link includes a t-shaped portion that slides in the track when the upper panel moves from the first configuration to the flat configuration.

16. The device of claim 11, further comprising:
    a second bi-stable shaft, a first end of the second bi-stable shaft rotatably attached to a third of the sides of the lower panel and a second end of the second bi-stable shaft rotatably attached to a third of the sides of the upper panel;
    a second guide link having two ends, a first end of the second guide link rotatably attached to the third side of the upper panel and a second end slidably inserted in a track parallel to the third side of the lower panel, wherein the third side of the lower panel and the third side of the upper panel are parallel to the first side of the upper panel and the first side of the lower panel.

17. The device of claim 11, further comprising:
another panel with four sides, a fifth and sixth surfaces, the fifth surface overlaying the third surface of the upper panel when the device is in the folded configuration.

18. A device comprising:
a first portion having a first surface and a track;
a second portion having a second surface, the second portion overlaying the first portion when the device is in a first position;
means for guiding the first surface, including a head, an interface portion, and a body connecting the head to the interface portion, the head rotatably affixed to the second portion and the interface portion being slidably retained in the track and at least a part of the interface portion being slidable in parallel to the first face; and
means for moving the first portion relative to the second portion when force is applied to the second portion, the means for moving including a cam and a shaft rigidly connected to the cam, the cam rotatably affixed to the first portion and an end of the shaft rotatably affixed to the second portion,
wherein
when the device is in a second position between the first position and a bi-stable position, the shaft moves the second portion toward the first position,
when the device is in a third position between the bi-stable position and a fully flat position, the shaft moves the second portion toward the fully flat position, and
when the device is in the fully flat position, the first surface and the second surface are in a substantially same plane, and
wherein the device is in the fully flat position when the body is positioned parallel to the first portion.

19. The device of claim 18, wherein the second portion includes a display.

20. The device of claim 19, wherein the device includes a cellular phone.

* * * * *